US011755186B2

(12) United States Patent
Yan

(10) Patent No.: US 11,755,186 B2
(45) Date of Patent: Sep. 12, 2023

(54) SCREEN CAPTURING METHOD AND TERMINAL DEVICE

(71) Applicant: VIVO MOBILE COMMUNICATION CO.,LTD., Guangdong (CN)

(72) Inventor: Weihao Yan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/681,433

(22) Filed: Feb. 25, 2022

(65) Prior Publication Data

US 2022/0179549 A1 Jun. 9, 2022

Related U.S. Application Data

(63) Continuation of application No. PCT/CN2020/100923, filed on Jul. 8, 2020.

(30) Foreign Application Priority Data

Aug. 26, 2019 (CN) .......................... 201910789493.4

(51) Int. Cl.
*G06F 3/04845* (2022.01)
*G06F 9/451* (2018.01)
(Continued)

(52) U.S. Cl.
CPC ...... *G06F 3/04845* (2013.01); *G06F 3/04883* (2013.01); *G06F 9/451* (2018.02); *G06T 11/60* (2013.01); *G06F 2203/04808* (2013.01)

(58) Field of Classification Search
CPC ........... G06F 9/451; G06F 2203/04808; G06F 3/04845; G06F 3/04883; G06T 11/60
See application file for complete search history.

(56) References Cited

U.S. PATENT DOCUMENTS

| 2008/0282160 A1* | 11/2008 | Tonnison | G06F 9/451 |
| | | | 715/785 |
| 2011/0013049 A1* | 1/2011 | Thorn | H04N 1/00307 |
| | | | 345/173 |

(Continued)

FOREIGN PATENT DOCUMENTS

| CN | 103984502 A | 8/2014 |
| CN | 104267931 A | 1/2015 |

(Continued)

OTHER PUBLICATIONS

The First Office Action of Priority Application No. CN 201910789493.4 issued by the Chinese Patent Office dated Aug. 20, 2020.

(Continued)

*Primary Examiner* — Tadesse Hailu
(74) *Attorney, Agent, or Firm* — IP&T Group LLP

(57) ABSTRACT

A screen capturing method includes: in a case that M interfaces are displayed on a screen of a terminal device, receiving a first input of a user on K interfaces in the M interfaces; in response to the first input, performing screen capturing operations on N interfaces that are corresponding to a parameter of the first input, to obtain N first images; and synthesizing the N first images to obtain a target screenshot, where the N interfaces are interfaces in the M interfaces, and M, N, and K are positive integers.

12 Claims, 5 Drawing Sheets

(51) Int. Cl.
  *G06F 3/04883* (2022.01)
  *G06T 11/60* (2006.01)

(56) References Cited

U.S. PATENT DOCUMENTS

| | | | | |
|---|---|---|---|---|
| 2011/0260962 | A1* | 10/2011 | Benko | G06F 3/04883 715/863 |
| 2012/0056832 | A1* | 3/2012 | Miyazaki | G06F 3/04886 345/173 |
| 2012/0229842 | A1* | 9/2012 | Groves | H04N 1/00347 358/401 |
| 2012/0306796 | A1* | 12/2012 | Ren | G06F 3/0488 345/173 |
| 2013/0207998 | A1* | 8/2013 | Aoki | G06F 3/017 345/619 |
| 2014/0253574 | A1* | 9/2014 | Brown | G06T 1/0007 345/545 |
| 2015/0268736 | A1* | 9/2015 | Cao | G06F 3/0482 345/156 |
| 2015/0288795 | A1* | 10/2015 | Park | G06F 3/04842 455/566 |
| 2015/0312773 | A1 | 10/2015 | Joshi et al. | |
| 2016/0239200 | A1* | 8/2016 | Fang | G06F 3/017 |
| 2016/0313883 | A1* | 10/2016 | Zhang | G06F 3/04883 |
| 2017/0010760 | A1 | 1/2017 | Rapport et al. | |
| 2017/0013179 | A1* | 1/2017 | Kang | H04N 23/631 |
| 2017/0108998 | A1* | 4/2017 | Van Der Westhuizen | G06F 3/0488 |
| 2017/0228138 | A1* | 8/2017 | Paluka | G06F 3/04842 |
| 2017/0277403 | A1* | 9/2017 | Huang | H04L 65/4015 |
| 2017/0289427 | A1* | 10/2017 | Eum | H04N 23/661 |
| 2017/0344131 | A1* | 11/2017 | Gnech | G06F 1/1694 |
| 2017/0364198 | A1* | 12/2017 | Yoganandan | G06F 3/0488 |
| 2018/0004312 | A1* | 1/2018 | Lee | G06F 3/04886 |
| 2018/0046341 | A1* | 2/2018 | Lee | G06F 3/04883 |
| 2018/0091728 | A1* | 3/2018 | Brown | G11B 27/34 |
| 2018/0114326 | A1* | 4/2018 | Roblek | G06T 7/30 |
| 2018/0203596 | A1* | 7/2018 | Dhaliwal | G06F 3/04817 |
| 2019/0147026 | A1* | 5/2019 | Jon | G06F 40/171 715/230 |
| 2020/0050349 | A1* | 2/2020 | Wang | G06F 3/0485 |

FOREIGN PATENT DOCUMENTS

| | | |
|---|---|---|
| CN | 105487766 A | 4/2016 |
| CN | 106940621 A | 7/2017 |
| CN | 107301013 A | 10/2017 |
| CN | 107977144 A | 5/2018 |
| CN | 107977145 A | 5/2018 |
| CN | 108803963 A | 11/2018 |
| CN | 109388304 A | 2/2019 |
| CN | 109710127 A | 5/2019 |
| CN | 109710349 A | 5/2019 |
| CN | 110658971 A | 1/2020 |

OTHER PUBLICATIONS

International Search Report and Written Opinion of International Application No. PCT/CN2020/100923 issued by the Chinese Patent Office dated Oct. 13, 2020.

* cited by examiner

SCREEN CAPTURING METHOD AND TERMINAL DEVICE

CROSS-REFERENCE OF RELATED APPLICATIONS

This application is a Bypass Continuation Application of PCT/CN2020/100923 filed on Jul. 8, 2020, which claims priority to Chinese Patent Application No. 201910789493.4 filed on Aug. 26, 2019, which are incorporated herein by reference in their entirety.

TECHNICAL FIELD

The present disclosure relates to the field of communications technologies, and in particular, to a screen capturing method and a terminal device.

BACKGROUND

In a scenario in which a terminal device performs a screen capturing function, a user may trigger the terminal device to capture an interface displayed on a screen of the terminal device by using a screen capturing method such as full screen capturing, long screen capturing, or screen capturing of a specific shape, that is, perform a screen capturing operation on the interface.

SUMMARY

According to a first aspect, an embodiment of the present disclosure provides a screen capturing method. The method includes: in a case that M interfaces are displayed on a screen of a terminal device, receiving a first input of a user on K interfaces in the M interfaces; in response to the first input, performing screen capturing operations on N interfaces that are corresponding to a parameter of the first input, to obtain N first images; and synthesizing the N first images to obtain a target screenshot, where the N interfaces are interfaces in the M interfaces, and M, N, and K are positive integers.

According to a second aspect, an embodiment of the present disclosure provides a terminal device, including a receiving module, a screen capturing module, and a synthesis module. The receiving module is configured to: in a case that M interfaces are displayed on a screen of the terminal device, receive a first input of a user on K interfaces in the M interfaces. The screen capturing module is configured to: in response to the first input received by the receiving module, perform screen capturing operations on N interfaces that are corresponding to a parameter of the first input, to obtain N first images. The synthesis module is configured to synthesize the N first images obtained by the screen capturing module to obtain a target screenshot, where the N interfaces are interfaces in the M interfaces, and M, N, and K are positive integers.

According to a third aspect, an embodiment of the present disclosure provides a terminal device, including a processor, a memory, and a computer program that is stored in the memory and executable on the processor. When the computer program is executed by the processor, the steps of the screen capturing method according to the first aspect are implemented.

According to a fourth aspect, an embodiment of the present disclosure provides a non-transitory computer-readable storage medium. The non-transitory computer-readable storage medium stores a computer program, and when the computer program is executed by a processor, the steps of the screen capturing method according to the first aspect are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure shall fall within the protection scope of the present disclosure.

It should be noted that "I" in this specification represents or. For example, AB may represent A or B. "and/or" in this specification merely describes an association relationship between associated objects, and indicates that there may be three relationships. For example, A and/or B may represent that there are three cases: There is only A, there are both A and B, and there is only B. The term "a plurality of" refers to two or more.

It should be noted that in this embodiment of the present disclosure, the term such as "exemplary" or "for example" is used for representing an example, an illustration, or a description. Any embodiment or design scheme described as an "example" or "for example" in the embodiments of the present disclosure should not be explained as being more preferred or having more advantages than another embodiment or design scheme.

In the specification and claims of the present disclosure, the terms "first", "second", and so on are intended to distinguish between different objects but do not describe a particular order of the objects. For example, a first interface, a second interface, and the like are intended to distinguish between different interfaces, instead of describing a particular order of the interfaces.

In the embodiments of the present disclosure, an example in which a clockwise direction, a counterclockwise direction, up, down, left, and right are inputs performed by a user on a display screen of a terminal device is used for description, that is, the clockwise direction, the counterclockwise direction, up, down, left, and right are inputs performed by the user on the display screen of the terminal device relative to the terminal device or the display screen of the terminal device.

Figure 1:
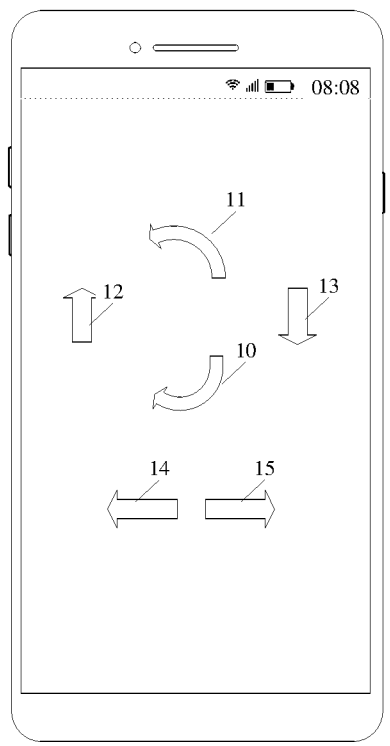
FIG. 1 is a schematic diagram of user's inputs to a terminal device according to an embodiment of the disclosure.

For example, user's sliding inputs in various directions are used for description. As shown in FIG. 1, on a display screen of a terminal device, 10 indicates a user's clockwise sliding input, 11 indicates a user's counterclockwise sliding input, 12 indicates a user's upward sliding input, 13 indicates a user's downward sliding input, 14 indicates a user's left sliding input, and 15 indicates a user's right sliding input.

Usually, in a case where the terminal device has a screen of a relatively large size, such as a foldable screen including a plurality of screens, the terminal device may display interfaces of a plurality of applications on the foldable screen. However, the terminal device generally performs screen capturing operations on all the interfaces displayed on the plurality of screens of the foldable screen, or performs a screen capturing operation on an interface displayed on one screen of the foldable screen, but cannot simultaneously perform screen capturing operations on interfaces displayed on several non-adjacent screens of the foldable screen. In this way, the flexibility for the terminal device to perform a screen capturing operation is poor.

According to a screen capturing method and a terminal device provided in the embodiments of the present disclosure, in a case that M interfaces are displayed on a screen of a terminal device, a first input of a user on K interfaces in the M interfaces may be received. In response to the first input, screen capturing operations are performed on N interfaces that are in the M interfaces and corresponding to a parameter of the first input, to obtain N first images. Thus, the N first images may be synthesized to obtain a target screenshot. In this way, the user does not need to trigger the terminal device to enter an input of a screen capturing mode first, and then perform an input of selecting one or more interfaces to be captured. Instead, the user can trigger the terminal device by using the first input to select one or more interfaces and perform screen capturing operations. Therefore, the user's operation in a screen capturing process can be simplified, so that the terminal device can quickly and flexibly perform the screen capturing operation.

The terminal device in the embodiments of the present disclosure may be a mobile terminal device or a non-mobile terminal device. The mobile terminal device may be a mobile phone, a tablet computer, a notebook computer, a palmtop computer, a vehicle-mounted terminal, a wearable device, an ultra-mobile personal computer (UMPC), a netbook, a personal digital assistant (PDA), or the like. The non-mobile terminal device may be a personal computer (PC), a television (TV), a teller machine, a self-service machine, or the like. This is not limited in the embodiments of the present disclosure.

It should be noted that, in the screen capturing method provided in the embodiments of the present disclosure, an execution body may be a terminal device, a central processing unit (CPU) of the terminal device, or a control module configured to perform the screen capturing method in the terminal device. In the embodiments of the present disclosure, an example in which the terminal device performs the screen capturing method is used to describe the screen capturing method provided in the embodiments of the present disclosure.

The terminal device in the embodiments of the present disclosure may be a terminal device with an operating system. The operating system may be an Android operating system, or may be an iOS operating system, or may be another possible operating system, which is not limited in the embodiments of the present disclosure.

The following uses the Android operating system as an example to describe a software environment to which the screen capturing method provided in the embodiments of the present disclosure is applied.

Figure 2:
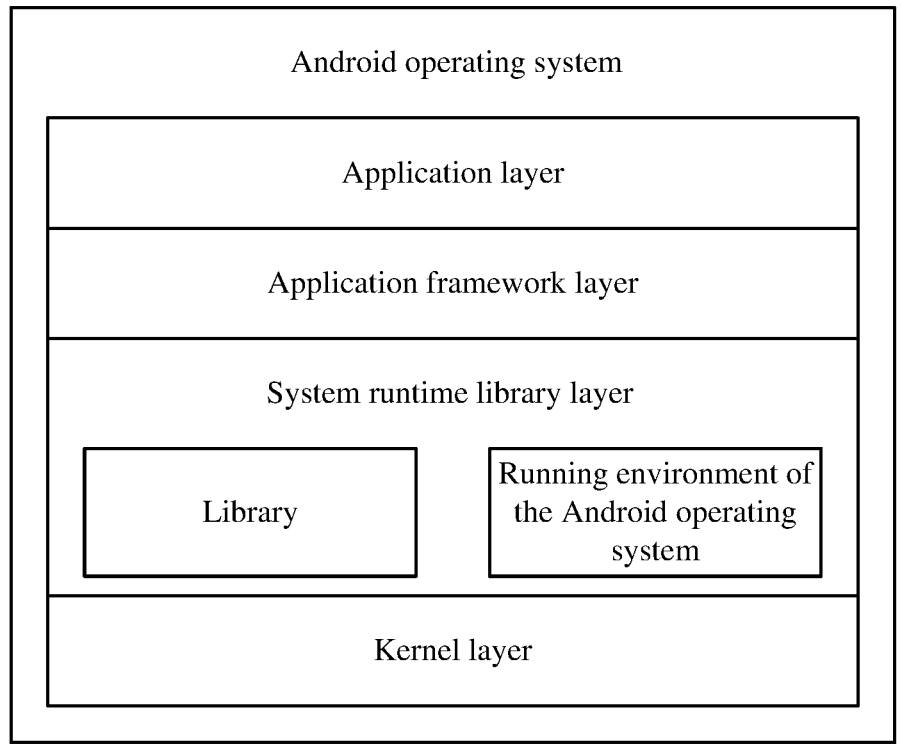
FIG. 2 is a schematic diagram of a possible architecture of an Android operating system according to an embodiment of the present disclosure.

FIG. 2 is a schematic diagram of a possible architecture of an Android operating system according to an embodiment of the present disclosure. In FIG. 2, the architecture of the Android operating system includes four layers, which are an application layer, an application framework layer, a system runtime library layer, and a kernel layer (which may be a Linux kernel layer).

The application layer includes various application programs in the Android operating system (including system application programs and third-party application programs).

The application program framework layer is an application program framework, and the developer may develop some application programs based on the application program framework layer when following a development rule of the application program framework, for example, application programs such as a system setting application, a system chat application, and a system camera application; or application programs such as a third-party setting application, a third-party camera application, and a third-party chat application.

The system runtime library layer includes a library (also referred to as a system library) and an Android operating system runtime environment. The library mainly provides various resources required for the Android operating system. The running environment of the Android operating system is configured to provide a software environment for the Android operating system.

The kernel layer is an operating system layer of the Android operating system, and is the lowest layer in software layers of the Android operating system. Based on the Linux kernel, the kernel layer provides core system services and hardware-related drivers for the Android operating system.

The Android operating system is used as an example. In the embodiments of the present invention, a developer may develop, based on the system architecture of the Android operating system shown in FIG. 2, a software program to implement the screen capturing method provided in the embodiments of the present disclosure, so that the screen capturing method can be performed based on the Android operating system shown in FIG. 2. That is, a processor or the terminal device may run the software program in the Android operating system to implement the screen capturing method provided in the embodiments of the present disclosure.

Figure 3:
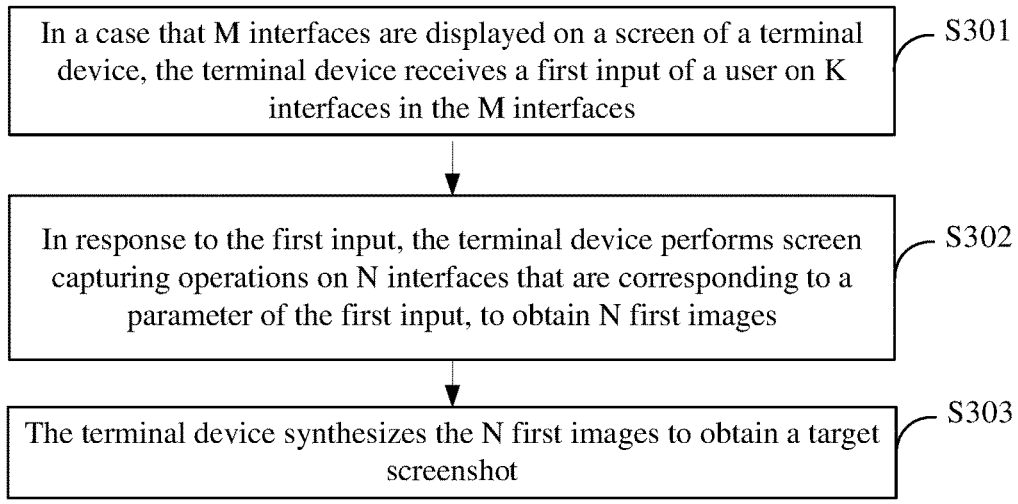
FIG. 3 is a schematic flowchart of a screen capturing method according to an embodiment of the disclosure.

The following describes in detail the screen capturing method provided in the embodiments of the present disclosure with reference to a flowchart of a screen capturing method illustrated in FIG. 3. Although a logical sequence of the screen capturing method provided in the embodiments of the present invention is shown in the method flowchart, in some cases, the shown or described steps may be performed in a sequence different from the sequence herein. For example, the screen capturing method illustrated in FIG. 3 may include S301 to S303.

S301: In a case that M interfaces are displayed on a screen of a terminal device, the terminal device receives a first input of a user on K interfaces in the M interfaces.

A parameter of the first input parameter includes at least one of: a number of input touch points, a position of an input touch point, an input track, an input direction, an input pressure value, an input area, an input length, an input fingerprint, or an input duration, and M and K are both positive integers.

It can be understood that, the parameter of the first input provided in this embodiment of the present disclosure may include but not limited to the parameters enumerated above, and may also be another parameter that can be implemented. Details are not described herein again in this embodiment of the present disclosure.

It should be noted that the screen of the terminal device provided in this embodiment of the present disclosure may be a touchscreen. The touchscreen may be configured to receive an input of a user, and display content corresponding to the input to the user in response to the input.

For example, the terminal device may have a fingerprint recognition module, such as an under-screen fingerprint recognition module, to support the user in performing fingerprint input on the screen, such as a first input whose parameter includes an input fingerprint.

It may be understood that, the first input may be used to select one or more interfaces, namely, K interfaces in the M interfaces, from the M interfaces to perform screen capturing operations.

It should be emphasized that, the user does not need to trigger the terminal device to enter an input (for example, an input such that various interfaces displayed on the screen of the terminal device are in a to-be-selected state) of a screen capturing mode first, and then perform an input of selecting one or more interfaces to be captured, to trigger the terminal device to perform screen capturing operations on the one or more interfaces. Instead, a convenient first input may be used to trigger the terminal device to select one or more interfaces and perform screen capturing operations.

An interface in the M interfaces may be an interface of an application or a desktop. For example, different interfaces in the M interfaces are different interfaces in a same application, or different interfaces in different applications.

Optionally, in this embodiment of the present disclosure, the terminal device may include one or more screens.

In the case where the terminal device includes one screen, the terminal device may display the M interfaces on the screen by using a split-screen technology. That is, the terminal device splits the screen into M regions, and displays one interface on each of the M regions.

In the case where the terminal includes a plurality of screens, the terminal device may display the M interfaces on the screen in any one of the following manners 1 to 3.

Manner 1: The terminal device displays one interface on each of the plurality of screens.

Manner 2: The terminal device displays one interface on each of some screens of the plurality of screens, and displays a plurality of interfaces on each of the other screens of the plurality of screens by using the split-screen technology.

Manner 3: The terminal device displays a plurality of interfaces on each of the plurality of screens by the split-screen technology.

Optionally, the plurality of screens included in the terminal device may be collapsible screens, that is, the terminal device is a collapsible terminal device. For example, the plurality of screens of the terminal device may be folded into different angles, that is, different screens are located on a same plane or different planes.

In the following part of this embodiment of the present disclosure, the screen capturing method provided in this embodiment of the present disclosure will be described with an example in which the terminal device includes a plurality of screens and displays the M interfaces according to Manner 2, and the plurality of screens are located on the same plane.

S302: In response to the first input, the terminal device performs screen capturing operations on N interfaces that are corresponding to a parameter of the first input, to obtain N first images.

The N interfaces are interfaces in the M interfaces. Each first image is a screenshot of one of the N interfaces, and N is a positive integer.

For example, the K interfaces are completely or partially the same as the N interfaces in quantity, for example, the K interfaces are one of the N interfaces.

It may be understood that the terminal device may perform a screen capturing operation on each of the N interfaces to obtain a screenshot of each interface.

It should be noted that the terminal device provided in this embodiment of the present disclosure can distinguish between different screens, and distinguish between different interfaces displayed on each screen. For example, the terminal device may mark each of the screens, such as numbering, in ascending order, a plurality of screens sequentially arranged from left to right (and/or from top to bottom).

It may be understood that the terminal device may determine a position of one screen in the terminal device based on the number of the screen, that is, defining a specific screen in the plurality of screens of the terminal device. In addition, the terminal device may determine the position of the interface in the terminal device based on the number of the interface, for example, defining a specific interface displayed on one or more screens.

Optionally, a number of each interface on the screen is kept unchanged or a number of each interface changes with running of the terminal device, which is not limited in the embodiment of the present disclosure. Generally, the number of each screen of the terminal device is kept unchanged.

It may be understood that the N interfaces may include adjacent interfaces and/or non-adjacent interfaces.

S303: The terminal device synthesizes the N first images to obtain a target screenshot.

It may be understood that the terminal device may synthesize the N first images to obtain one image, namely, the target screenshot.

For example, the terminal device may save the target screenshot, for example, save the target screenshot to a preset storage area, for example, a storage area in the terminal device or a storage area in a cloud, which is not limited in this embodiment of the present disclosure. In addition, the terminal device may further save the N first images, for example, save the N first images to a preset storage area.

It should be noted that, according to the screen capturing method provided in this embodiment of the present disclosure, in a case that M interfaces are displayed on a screen of a terminal device, a first input of a user on K interfaces in the M interfaces may be received. In response to the first input, screen capturing operations are performed on N interfaces that are in the M interfaces and corresponding to a parameter of the first input, to obtain N first images. Thus, the N first images may be synthesized to obtain a target screenshot. In this way, the user does not need to trigger the terminal device to enter an input of a screen capturing mode first, and then perform an input of selecting one or more interfaces to be captured. Instead, the user can trigger the terminal device by using the first input to select one or more interfaces and perform screen capturing operations. Therefore, the user's operation in a screen capturing process can be simplified, so that the terminal device can quickly and flexibly perform the screen capturing operation.

Optionally, in a possible implementation, this embodiment of the present disclosure may be applied to any one of the following scenarios 1 to 3.

Scenario 1: The terminal device performs a screen capturing operation on one interface displayed on the screen.

Scenario 2: The terminal device performs screen capturing operations on a plurality of adjacent interfaces displayed on the screen.

Scenario 3: The terminal device performs screen capturing operations on a plurality of non-adjacent interfaces displayed on the screen.

Optionally, in Scenario 1, the first input may be an input of pressing an interface by a user with two fingers for more than a specific period of time (for example, 0.2 s) and moving the two fingers downward simultaneously. The parameter of the first input is used to indicate the following: an input location of the first input is on the screen A2, there are two initial input touch points, input duration is greater than or equal to 0.2 seconds, and an input direction is a downward direction.

Figure 4:
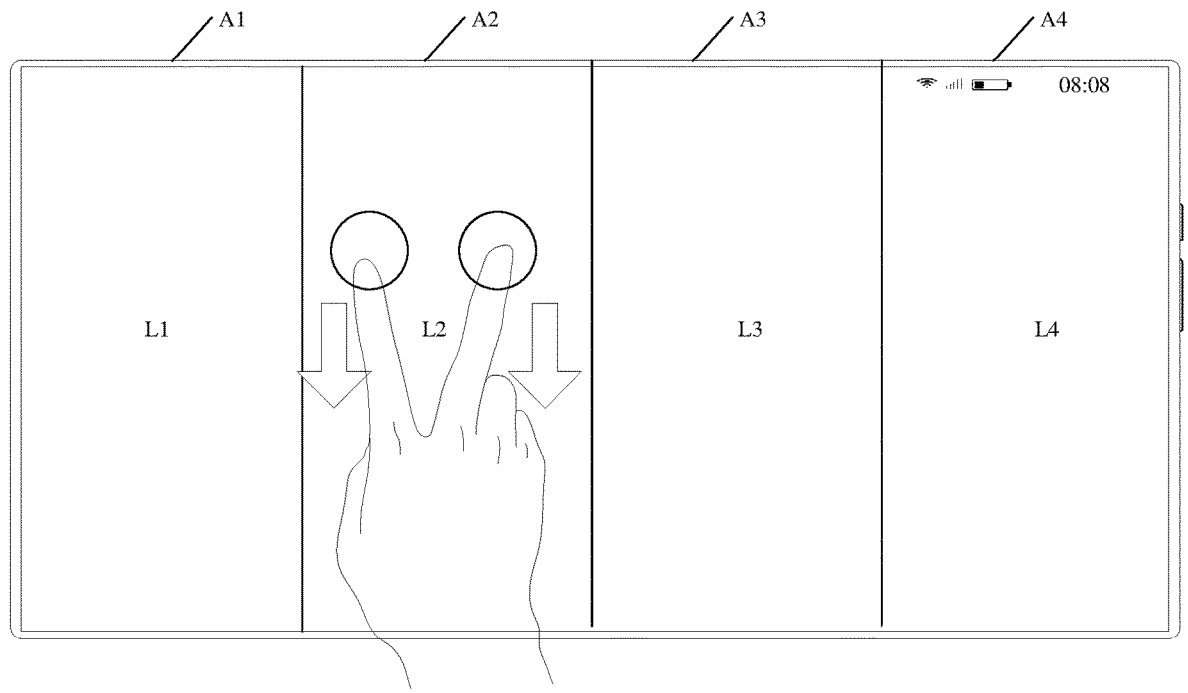
FIG. 4 is a first schematic diagram of content displayed on a terminal device according to an embodiment of the present disclosure.

FIG. 4 is a schematic diagram of content displayed on a terminal device according to an embodiment of the present disclosure. The terminal device shown in FIG. 4 includes four screens: A1, A2, A3, and A4, and interfaces L1, L2, L3, and L4 are respectively displayed on the four screens. When the user performs an input of pressing the screen A2 with two fingers for more than 0.2 s and controlling the two fingers to slide downward simultaneously (that is, performs the first input), the terminal device may determine that the interface L2 is an interface on which a screen capturing operation needs to be performed, and performs a screen capturing operation on the interface L2. The terminal device may obtain and save a target screenshot, and the target screenshot is a screenshot of the interface L2 (recorded as an image S2).

In this way, a user may control, through a quick and convenient first input, a terminal device to quickly perform a screen capturing operation on an interface displayed on a screen, to obtain a screenshot of the interface.

For example, the K interfaces are one interface of the N interfaces, that is, K is equal to 1. For example, the first input may be an input of pressing an interface, that needs to be screen captured, with two fingers for more than a specific period of time (for example, 0.2 s), and moving the two fingers to slide leftward and rightward, respectively. For example, if a selected interface is the leftmost interface, only the left finger needs to be moved; or if the selected interface is the rightmost interface, only the right finger needs to be moved. In this case, a parameter of the first input indicates the following: an input location of the first input is on the screen A2, there are two initial input touch points, input duration is greater than or equal to 0.2 s, and an input direction is a leftward and/or rightward direction.

Figure 5:
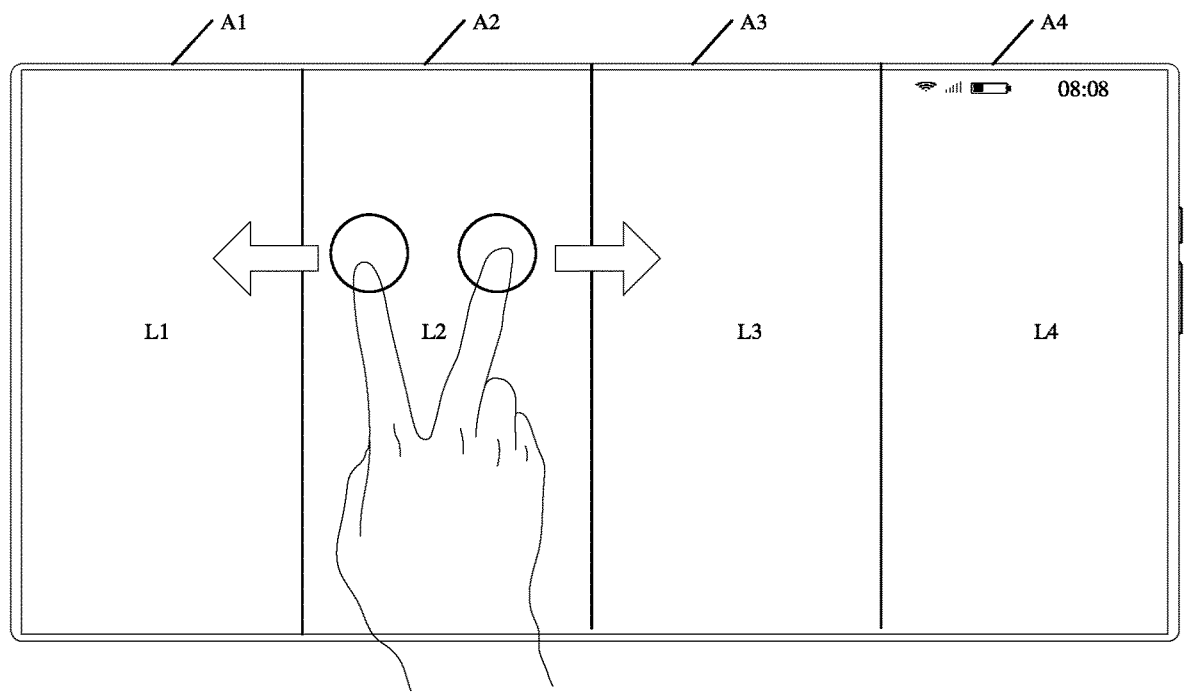
FIG. 5 is a second schematic diagram of content displayed on a terminal device according to an embodiment of the present disclosure.

FIG. 5 is a schematic diagram of content displayed on a terminal device according to an embodiment of the present disclosure. As shown in FIG. 4 and FIG. 5, the user may press the screen A2 with two fingers for more than 0.2 s, and move the two fingers to slide leftward and rightward, respectively, to select, depending on a displacement distance of the fingers of the user, an interface that needs to be screen captured by the user. After the fingers are lifted off the screen, the terminal device reads the interface selected by the user, to perform a screen capturing operation on the interface, and generate a target screenshot.

In this way, a user may control, through a quick and convenient first input, a terminal device to quickly perform screen capturing operations on a plurality of adjacent interfaces displayed on screens, to quickly obtain screenshots of the plurality of adjacent interfaces, that is, quickly obtain a target screenshot.

Optionally, in a first example of Scenario 3, the first input is used for performing screen capturing on a plurality of non-adjacent applications. In this case, a multiple-finger pressing and downward-sliding manner may be used, for example, a plurality of interfaces are pressed with a plurality of fingers for more than a period of time (for example, 0.2 s) and the plurality of fingers are dragged downward simultaneously, so as to read the display interfaces, pressed by the plurality of fingers, of the applications. In this case, the interfaces on which the user performs the operations are interfaces on which the user needs to perform screen capturing operations, and the terminal device may perform screen capturing operations on these interfaces.

Figure 6:
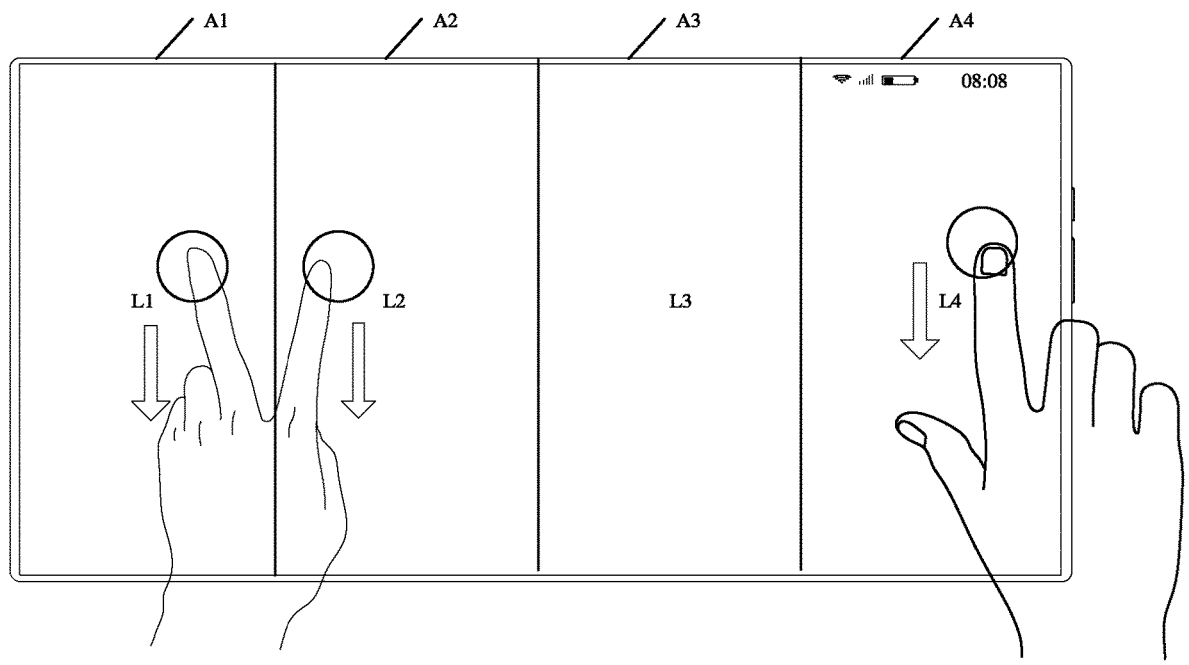
FIG. 6 is a third schematic diagram of content displayed on a terminal device according to an embodiment of the present disclosure.

FIG. 6 is a schematic diagram of content displayed on a terminal device according to an embodiment of the present disclosure. As shown in FIG. 4 and FIG. 6, the user may press the screen A1, the screen A2, and the screen A4 with three fingers respectively for more than a period of time (for example, 0.2 s), and move the three fingers to slide downward. In this case, a parameter of the first input is used to indicate the following: input locations of the first input are on the screens A1, A2, and A4, there are three initial input touch points, input duration is greater than or equal to 0.2 s, and an input direction is a downward direction. For example, the terminal device may determine that the interfaces L1, L2, and L4 are interfaces on which screen capturing operations need to be performed, and perform screen capturing operations on these interfaces. The terminal device may obtain and save a target screenshot, and the target screenshot is an image obtained by synthesizing a screenshot of the interface L1 (recorded as an image S1), a screenshot of the interface L2 (namely, the image S2), and a screenshot of the interface L4 (recorded as an image S4).

In this way, a user may control, through a quick and convenient first input, a terminal device to quickly perform screen capturing operations on a plurality of non-adjacent interfaces displayed on screens, to quickly obtain screenshots of the plurality of non-adjacent interfaces, that is, quickly obtain a target screenshot.

Optionally, in a second example of Scenario 3, the N interfaces include a first interface and a second interface that are adjacent to each other. The first input includes a sliding input from the first interface to the second interface. An input track of the first input includes a first sliding track on the first interface and a second sliding track on the second interface. A difference between first coordinates and second coordinates is within a preset value range (for example, 0 cm-0.5 cm). The first coordinates are coordinates of a last touch point of the first slide track in a first direction, the second coordinates are coordinates of a first touch point of the second sliding track in the first direction, the first direction is perpendicular to the second direction, and the second direction is a direction from the first interface to the second interface. For example, the first direction is a positive direction of the Y axis, the second direction is a positive direction of the X axis, that is, the first coordinates and the second coordinates are coordinates in a direction of the Y axis.

For example, when the user performs screen capturing operations on a plurality of non-adjacent interfaces, screen capturing may be performed based on a finger motion track. The user presses an interface, that needs to be screen captured, on the leftmost side of the interface with two fingers for more than a period of time (for example, for more than 0.2 s), and moves the two fingers to slide rightward (or, the user presses an interface of an application, for which screen capturing needs to be performed, on the rightmost side of the application with two fingers for more than a period of time, and moves the two fingers to slide leftward). When the fingers slide to an interface, an application corresponding to the interface is selected if the coordinates on the Y axis have no obvious deviation, or the application corresponding to the interface is not selected if a downward deviation of the coordinates on the Y axis is greater than a target threshold. After the fingers slide to a next interface subsequently, an application corresponding to the interface is selected if an upward deviation of the coordinates is greater than the target threshold, or the application corresponding to the interface is not selected if the upward deviation of the coordinates is not greater than the target threshold.

Figure 7:
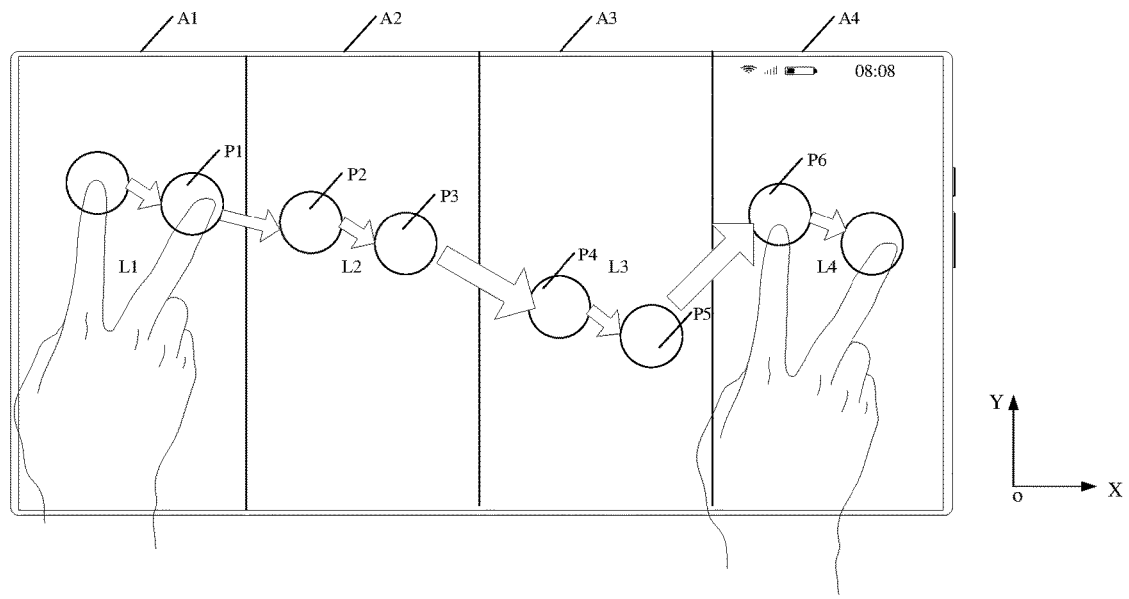
FIG. 7 is a fourth schematic diagram of content displayed on a terminal device according to an embodiment of the present disclosure.

FIG. 7 is a schematic diagram of content displayed on a terminal device according to an embodiment of the present disclosure. As shown in FIG. 4 and FIG. 7, the user may press the screen A1 with two fingers for more than a period of time (for example, 0.2 s), and move the two fingers to slide rightward. A last touch point of the user's finger on the screen A1 is a touch point P1, a first touch point of the user's finger on the screen A2 is a touch point P2, and a last touch point of the user's finger on the screen A2 is a touch point P3; a first touch point of the user's finger on the screen A3 is a touch point P4, and a last touch point of the user's finger on the screen A3 is a touch point P5; and a first touch point of the user's finger on the screen A4 is a touch point P6, and a last touch point of the user's finger on the screen A4 is a touch point P7. For example, a difference between a coordinate y1 of the touch point P1 on the Y axis and a coordinate y2 of the touch point P2 on the Y axis is less than a target threshold (for example, 0.5 cm). A difference between a coordinate y3 of the touch point P3 on the Y axis and a coordinate y4 of the touch point P4 on the Y axis is greater than the target threshold. A difference between a coordinate y5 of the touch point P5 on the Y axis and a coordinate y6 of the touch point P6 on the Y axis is less than the target threshold. In this case, the terminal device may determine that the interfaces L1, L2, and L4 are interfaces on which screen capturing operations need to be performed, and perform screen capturing operations on these interfaces. The terminal device may obtain and save a target screenshot, and the target screenshot is an image obtained by synthesizing a screenshot of the interface L1 (namely, an image S1), a screenshot of the interface L2 (namely, the image S2), and a screenshot of the interface L4 (namely, an image S4).

For example, a parameter of the first input is used to indicate the following: input locations of the first input are on all the screens, there are two initial input touch points, initial input duration is greater than or equal to 0.2 s, and an input direction is a direction in which the interfaces are arranged (for example, a direction from the first interface to the second interface).

It may be understood that, when the first interface is the interface L1 and the second interface is the interface L2, a first coordinate is the coordinate y1, and a second coordinate is the coordinate y2. A value obtained by subtracting y2 from y1 is less than the target threshold (that is, a difference between the first coordinate and the second coordinate is in a preset value range). In this case, the terminal device may determine that the interfaces L1 and L2 are interfaces on which screen capturing operations need to be performed.

In this way, a user may control, through a quick and convenient first input, a terminal device to quickly perform screen capturing operations on a plurality of non-adjacent interfaces displayed on screens, to quickly obtain screenshots of the plurality of non-adjacent interfaces, that is, quickly obtain a target screenshot.

In a possible implementation, in the screen capturing method provided in this embodiment of the present disclosure, step S304 may alternatively be performed after the foregoing step S302.

S304: When a first control is displayed on a screen, the terminal device performs screen capturing operations on the N interfaces corresponding to the parameter of the first input.

The first control is used to prompt the user that the foregoing N interfaces are interfaces on which screen capturing operations are to be performed.

Optionally, the first control is a text box. In this case, when the user controls, through a first input, the terminal device to select an interface to be screen captured, the terminal device may display text information, for example, "A first interface, a second interface, and a fourth interface are selected as interfaces to be screen captured." on the first control.

Optionally, the first control includes M sub-controls, and each sub-control corresponds to one interface in the M interfaces displayed on the screens of the terminal device. For example, if a sub-control is in a selected state, it indicates that the interface corresponding to the sub-control is in the selected state, and the terminal device may perform a screen capturing operation on the interface. Otherwise, if a sub-control is in an unselected state, it indicates that the interface corresponding to the sub-control is in the unselected state, and the terminal device may not perform a screen capturing operation on the interface.

It should be noted that, the terminal device may display a selected sub-control with a preset effect, to indicate to the user that the interface corresponding to the sub-control is in the selected state. The foregoing preset effect may include at least one of: magnified display, display according to preset transparency (for example, the transparency is 60%), filling display, or the like. Certainly, the preset effect includes but is not limited to the effects listed in the foregoing example, and may alternatively be any other effects that can be implemented, which is not described again in this embodiment of the present disclosure.

Figure 8:
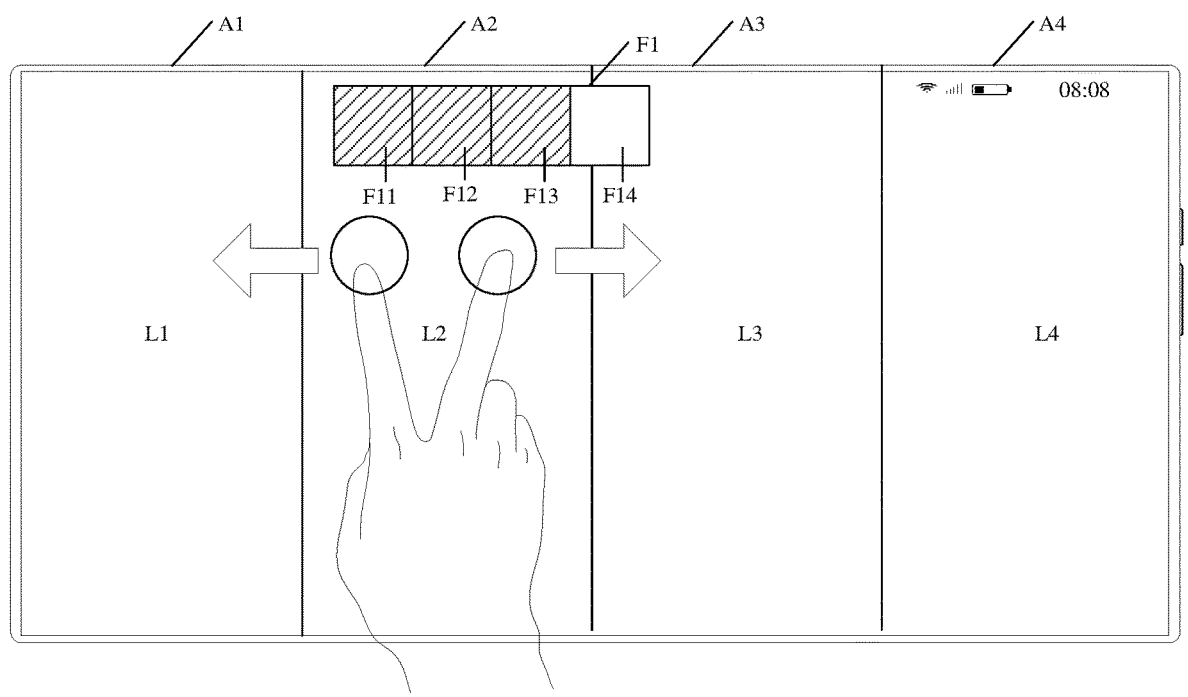
FIG. 8 is a fifth schematic diagram of content displayed on a terminal device according to an embodiment of the present disclosure.

For example, with reference to FIG. 5, FIG. 8 is a schematic diagram of content displayed on a terminal device according to an embodiment of the present disclosure. In FIG. 8, the terminal device may alternatively display a first control F1 on a screen. The first control F1 includes a sub-control F11, a sub-control F12, a sub-control F13, and a sub-control F14. The sub-controls F11 to F14 correspond to the interfaces L1 to L4, respectively. For example, FIG. 8 shows the sub-controls F11 to F13 displayed in a filling effect, that is, the sub-controls F11 to F13 are in a selected state, but the sub-control F14 is in an unselected state, which indicates that the interfaces L1 to L3 are interfaces on which screen capturing operations need to be performed.

It should be noted that, in this embodiment of the present disclosure, when the terminal device performs screen capturing operations on the N interfaces corresponding to the parameter of the first input, the terminal device may prompt, through the first control, the user of interfaces, on which the user is about to perform the screen capturing operations, of the foregoing N interfaces, that is, prompt the user of specific interfaces on which the user is about to perform the screen capturing operations. In this way, the user may intuitively learn on which interfaces the terminal device is about to perform screen capturing operations, which helps reduce misoperations of a user caused when selecting an interface on which a screen capturing operation needs to be performed.

In a possible implementation, step S203 in the foregoing embodiment may be implemented by S203a.

S203a: The terminal device synthesizes, according to a target template, the N first images to obtain the target screenshot.

The target template is predefined or selected from a set of preset templates. The predefined target template may be a default template in the terminal device.

Optionally, the target template is used to instruct the terminal device to synthesize the N first images in a stitching manner, stacking manner, or fusion manner to obtain the target screenshot, which is not described in detail in this embodiment of the present disclosure.

For example, the stitching manner may be a manner of stitching in sequence from left to right, or stitching in sequence from top to bottom, or stitching in sequence from bottom to top. The stacking manner may include a manner of stacking in sequence from top to bottom, stacking in sequence from bottom to top, and the like. The foregoing fusion manner may indicate fusion of a plurality of images based on information such as brightness, color, temperature, distance, and other scenery characteristics, which is not limited in this embodiment of the present disclosure.

It should be noted that, in this embodiment of the present disclosure, because a user may trigger a terminal device to synthesize, according to a target template, N first images to obtain a target screenshot, it is avoided that the terminal device combines the N first images disorderly, so that a pattern of the target screenshot can meet requirements of the user.

Optionally, in a possible implementation, the foregoing step S303a may be implemented by step S303b and S303c in this embodiment of the present disclosure.

S303b: The terminal device arranges the N first images according to the target template, and adds a target object on a target image, where the target image is an image in the N first images. N is greater than or equal to 1.

Optionally, the target object may be files such as text and pictures (such as pictures of emoticons).

S303C: The terminal device synthesizes the N first images and the target image to obtain the target screenshot.

For example, the terminal device may stack the target object on the target image to obtain the target screenshot obtained by synthesizing the N first images and the target object. The target object is input by the user or determined based on information of the target image.

For example, the target object added by the terminal device is text "I am very happy today!" or an emoticons indicating "Come on!". The target image is an image S2.

Optionally, the information about the target image includes at least one of: content of the target image or an application to which target image belongs.

For example, the interface L1 is a balance interface in a payment application 1, and the interface L2 is a balance interface in a payment application 2. Based on content of the interfaces L1 and L2, the terminal device determines the target object as custom text "Living on dirt". The target image includes the image S1 and the image S2, part of the text "Living on dirt" may be stacked on the image S1 for display, and the other part is stacked on the image S2 for display.

It should be noted that, in the screen capturing method provided in this embodiment of the present disclosure, because a terminal device may add a target object such as user-defined text or picture on a target screenshot obtained through a screen capturing operation, the screen capturing operation process becomes more interesting.

Figure 9:
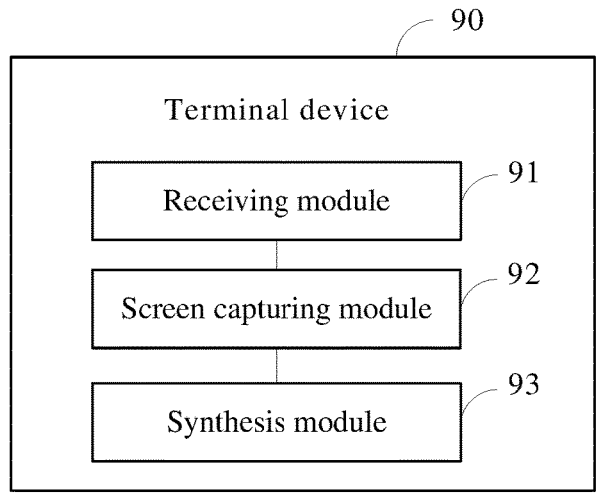
FIG. 9 is a possible schematic structural diagram of a terminal device according to an embodiment of the present disclosure.

FIG. 9 is a structural schematic diagram of a terminal device according to an embodiment of the present disclosure. The terminal device 90 shown in FIG. 9 includes a receiving module 91, a screen capturing module 92, and a synthesis module 93. The receiving module 91 is configured to: in a case that M interfaces are displayed on a screen of the terminal device, receive a first input of a user on K interfaces in the M interfaces. The screen capturing module 92 is configured to: in response to the first input received by the receiving module 91, perform screen capturing operations on N interfaces that are corresponding to a parameter of the first input, to obtain N first images. The synthesis module 93 is configured to synthesize the N first images obtained by the screen capturing module 92 to obtain a target screenshot. The N interfaces are interfaces in the M interfaces, and M, N, and K are positive integers.

Optionally, the N interfaces includes a first interface and a second interface that are adjacent to each other, and the first input includes a sliding input from the first interface to the second interface. An input track of the first input includes a first sliding track on the first interface and a second sliding track on the second interface. A difference between first coordinates and second coordinates is within a preset value range, the first coordinates are coordinates of the last touch point of the first sliding track in a first direction, and the second coordinates are coordinates of the first touch point of the second sliding track in the first direction. The first direction is perpendicular to a second direction, and the second direction is a direction from the first interface to the second interface.

Optionally, a first control is further displayed on the screen. The screen capturing module 92 is configured to perform screen capturing operations on the N interfaces in a case that the first control indicates that the N interfaces are in a selected state.

Optionally, the synthesis module 93 is configured to synthesize, according to a target template, the N first images to obtain the target screenshot. The target template is predefined or selected from a set of preset templates.

Optionally, N is greater than 1. The synthesis module 93 is configured to: arrange the N first images according to the target template, and add a target object on a target image, where the target image is an image in the N first images; and synthesize the N first images and the target object to obtain the target screenshot. The target object is input by the user or determined based on information about the target image.

Optionally, the information about the target image includes at least one of: content of the target image or an application to which target image belongs.

The terminal device 90 provided in this embodiment of the present disclosure can implement processes implemented by the terminal device in the foregoing method embodiments. To avoid repetition, details are not described herein again.

According to the terminal device provided in this embodiment of the present disclosure, in a case that M interfaces are displayed on a screen of a terminal device, a first input of a user on K interfaces in the M interfaces may be received. In response to the first input, screen capturing operations are performed on N interfaces that are in the M interfaces and corresponding to a parameter of the first input, to obtain N first images. Thus, the N first images may be synthesized to obtain a target screenshot. In this way, the user does not need to trigger the terminal device to enter an input of a screen capturing mode first, and then perform an input of selecting one or more interfaces to be captured. Instead, the user can trigger the terminal device by using the first input to select one or more interfaces and perform screen capturing operations. Therefore, the user's operation in a screen capturing process can be simplified, so that the terminal device can quickly and flexibly perform the screen capturing operation.

Figure 10:
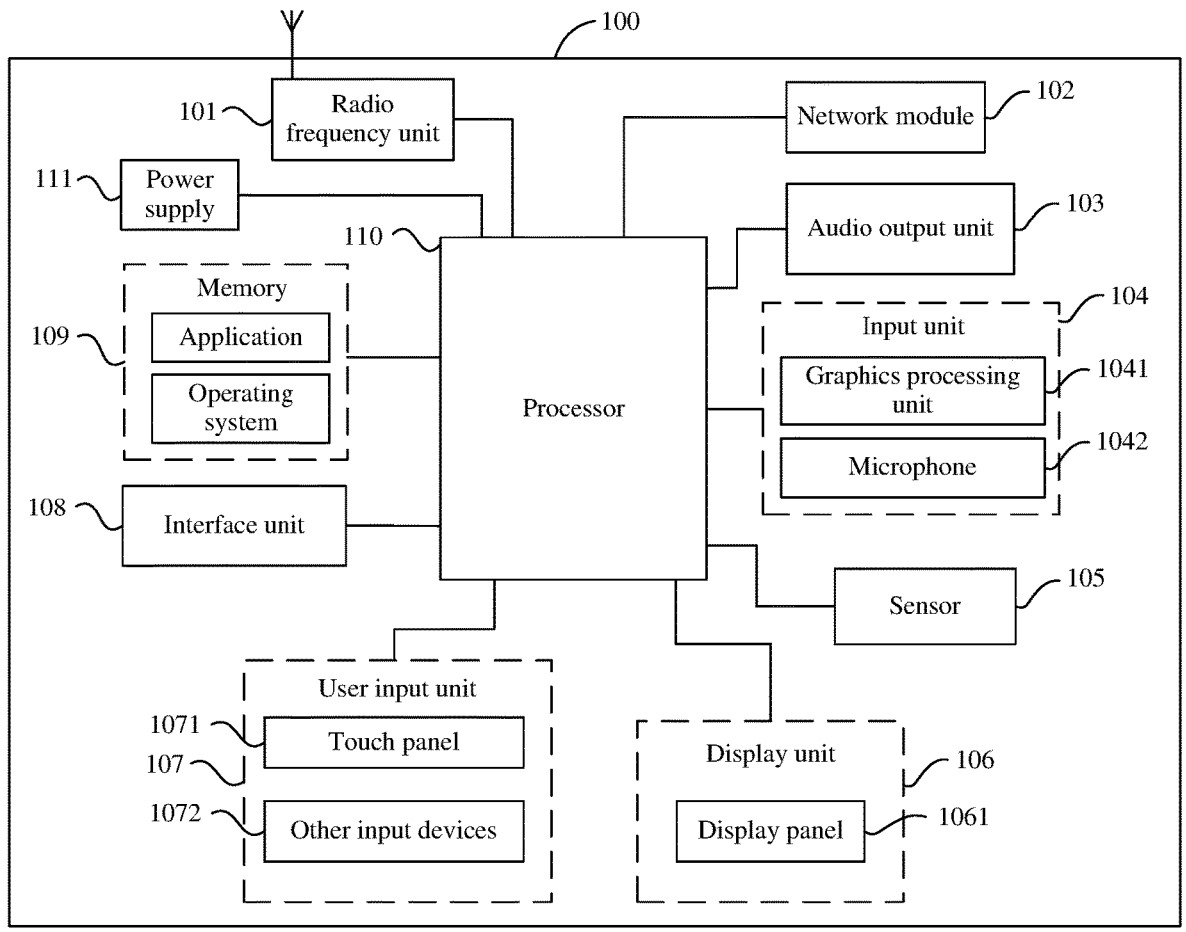
FIG. 10 is a schematic diagram of a hardware structure of a terminal device according to an embodiment of the present disclosure.

FIG. 10 is a schematic diagram of a hardware structure of a terminal device according to an embodiment of the present disclosure. The terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. It can be understood by a person skilled in the art that, the terminal device structure shown in FIG. 10 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a notebook computer, a palmtop computer, a vehicle-mounted terminal, a wearable device, and a pedometer.

The processor 110 is configured to: in a case that M interfaces are displayed on a screen of the terminal device, receive a first input of a user on K interfaces in the M interfaces. The processor 110 is configured to: in response to the first input received by a receiving module 91, perform screen capturing operations on N interfaces that are corresponding to a parameter of the first input, to obtain N first images; and synthesize the N first images to obtain a target screenshot. The N interfaces are interfaces in the M interfaces, and M, N, and K are positive integers.

According to the terminal device provided in this embodiment of the present disclosure, in a case that M interfaces are displayed on a screen of a terminal device, a first input of a user on K interfaces in the M interfaces may be received. In response to the first input, screen capturing operation are performed on N interfaces that are in the M interfaces and corresponding to a parameter of the first input, to obtain N first images. Thus, the N first images may be synthesized to obtain a target screenshot. In this way, the user does not need to trigger the terminal device to enter an input of a screen capturing mode first, and then perform an input of selecting one or more interfaces to be captured. Instead, the user can trigger the terminal device by using the first input to select one or more interfaces and perform screen capturing operations. Therefore, the user's operation in a screen capturing process can be simplified, so that the terminal device can quickly and flexibly perform the screen capturing operation.

It should be understood that in this embodiment of the present disclosure, the radio frequency unit 101 may be configured to receive and transmit information, or receive and transmit a signal during a call. For example, the radio frequency unit 101 receives downlink data from a base station, and then transmits the downlink data to the processor 110 for processing; and in addition, transmits uplink data to the base station. Generally, the radio frequency unit 101 includes but is not limited to: an antenna, at least one amplifier, a transceiver, a coupler, a low noise amplifier, and a duplexer, and the like. In addition, the radio frequency unit 101 may further communicate with another communications device through a wireless communication system and network.

The terminal device provides wireless broadband Internet access for the user by using the network module 102, for example, helping the user to send and receive an email, browse a web page, and access streaming media.

The audio output unit 103 may convert audio data received by the radio frequency unit 101 or the network module 102 or stored in the memory 109 into an audio signal, and output the audio signal as sound. In addition, the audio output unit 103 may further provide an audio output (for example, a call signal receiving sound and a message receiving sound) related to a specific function performed by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042. The graphics processing unit 1041 processes image data of a static picture or a video obtained by an image capturing apparatus (for example, a camera) in an image capturing mode or a video capturing mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive sound and can process such sound into audio data. The processed audio data may be converted, in a call mode, into a format that may be transmitted to a mobile communication base station by using the radio frequency unit 101 for output.

The terminal device 100 further includes at least one sensor 105, for example, an optical sensor, a motion sensor, and other sensors. For example, the optical sensor includes an ambient light sensor and a proximity sensor. The ambient light sensor may adjust luminance of a display panel 1061 based on brightness of an ambient light. The proximity sensor may turn off the display panel 1061 and/or a backlight when the terminal device 100 approaches an ear. As a type of motion sensor, an accelerometer sensor can detect magnitudes of accelerations in all directions (usually three axes), can detect a magnitude and a direction of gravity in a static state, and can be configured to recognize a terminal device posture (such as screen switching between portrait and landscape, related games, and magnetometer posture calibration), functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information inputted by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive inputted digit or character information, and generate key signal input related to user setting and function control of the terminal device. For example, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection device detects a touch position of the user, detects a signal brought by the touch operation, and sends the signal to the touch controller. The touch controller receives touch information from the touch detection device, converts the touch information into touch point coordinates, sends the touch point coordinates to the processor 110, and receives and executes a command sent by the processor 110. In addition, the touch panel 1071 may be implemented in a plurality of types such as a resistive type, a capacitive type, an infrared ray, and a surface acoustic wave. The user input unit 107 may include the another input device 1072 in addition to the touch panel 1071. For example, the another input device 1072 may include, but is not limited to, a physical keyboard, a function key (for example, a volume control key or a switch key), a trackball, a mouse, and a joystick. Details are not described herein again.

Optionally, the touch panel 1071 can cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although the touch panel 1071 and the display panel 1061 are used as two separate components to implement input and output functions of the terminal device in FIG. 10, in some embodiments, the touch panel 1071 and the display panel 1061 may be integrated to implement the input and output functions of the terminal device. This is not limited herein.

The interface unit 108 is an interface for connecting an external apparatus with the terminal device 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application (for example, a sound play function or an image play function) required for at least one function, and the like. The data storage area may store data created based on use of the mobile phone (for example, audio data and a phone book), and the like. In addition, the memory 109 may include a high-speed random access memory, and may further include a nonvolatile memory, for example, at least one disk storage device, a flash memory, or another volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, the processor 110 may be integrated with an application processor and a modem processor. The application processor mainly processes an operating system, a user interface, an application, and the like, and the modem processor mainly processes wireless communication. It can be understood that the foregoing modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some function modules not shown, and details are not described herein.

Optionally, an embodiment of the present disclosure further provides a terminal device, including a processor 110, a memory 109, and a computer program that is stored in the memory 109 and executable on the processor 110. When the computer program is executed by the processor 110, the processes of the screen capturing method embodiments are implemented, with the same technical effects achieved. To avoid repetition, details are not described herein again.

An embodiment of the present disclosure further provides a non-transitory computer-readable storage medium, and a computer program is stored in the non-transitory computer readable storage medium. When the computer program is executed by a processor, the processes of the foregoing screen capturing method embodiments are implemented, with the same technical effects achieved. To avoid repetition, details are not described herein again. The non-transitory computer-readable storage medium may be, for example, a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the foregoing embodiment methods may be implemented by software in addition to a necessary universal hardware platform or by hardware only. In most circumstances, the former is a preferred implementation. Based on such an understanding, the technical solutions of the present disclosure essentially, or the part contributing to the related art may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present the present disclosure and the protection scope of the claims. All these variations shall fall within the protection of the present disclosure.

What is claimed is:

1. A screen capturing method, wherein the method comprises:
    in a case that M interfaces are displayed on a screen of a terminal device, receiving a first input of a user on K interfaces in the M interfaces;
    in response to the first input, performing screen capturing operations on N interfaces that are corresponding to a parameter of the first input, to obtain N first images; and
    synthesizing the N first images to obtain a target screenshot, wherein
    the N interfaces are interfaces in the K interfaces, and M, N, and K are positive integers; wherein
    the N interfaces comprise a first interface and a second interface that are adjacent to each other, and the first input comprises a sliding input from the first interface to the second interface, wherein
    an input track of the first input comprises a first sliding track on the first interface and a second sliding track on the second interface; a difference between first coordinates and second coordinates is within a preset value range, the first coordinates are coordinates of a last touch point of the first sliding track in a first direction, and the second coordinates are coordinates of a first touch point of the second sliding track in the first direction; and the first direction is perpendicular to a second direction, and the second direction is a direction from the first interface to the second interface.

2. The method according to claim 1, wherein the synthesizing the N first images to obtain a target screenshot comprises:
    synthesizing, according to a target template, the N first images to obtain the target screenshot, wherein
    the target template is predefined or selected from a set of preset templates.

3. The method according to claim 2, wherein N is greater than 1; and
    the synthesizing, according to a target template, the N first images to obtain the target screenshot comprises:
    arranging the N first images according to the target template, and adding a target object on a target image, wherein the target image is an image in the N first images; and
    synthesizing the N first images and the target object to obtain the target screenshot, wherein
    the target object is input by the user or determined based on information about the target image.

4. The method according to claim 3, wherein the information about the target image comprises at least one of: content of the target image or an application to which the target image belongs.

5. A terminal device, comprising a processor, a memory, and a computer program stored in the memory and executable on the processor, wherein the computer program, when executed by the processor, causes the terminal device to perform:
    in a case that M interfaces are displayed on a screen of the terminal device, receiving a first input of a user on K interfaces in the M interfaces;
    in response to the first input, performing screen capturing operations on N interfaces that are corresponding to a parameter of the first input, to obtain N first images; and
    synthesizing the N first images to obtain a target screenshot, wherein
    the N interfaces are interfaces in the K interfaces, and M, N, and K are positive integers; wherein
    the N interfaces comprise a first interface and a second interface that are adjacent to each other, and the first input comprises a sliding input from the first interface to the second interface, wherein
    an input track of the first input comprises a first sliding track on the first interface and a second sliding track on the second interface; a difference between first coordinates and second coordinates is within a preset value range, the first coordinates are coordinates of a last touch point of the first sliding track in a first direction, and the second coordinates are coordinates of a first touch point of the second sliding track in the first direction; and the first direction is perpendicular to a second direction, and the second direction is a direction from the first interface to the second interface.

6. The terminal device according to claim 5, wherein the computer program, when executed by the processor, causes the terminal device to perform:
    synthesizing, according to a target template, the N first images to obtain the target screenshot, wherein
    the target template is predefined or selected from a set of preset templates.

7. The terminal device according to claim 6, wherein N is greater than 1; and the computer program, when executed by the processor, causes the terminal device to perform:
    arranging the N first images according to the target template, and adding a target object on a target image, wherein the target image is an image in the N first images; and
    synthesizing the N first images and the target object to obtain the target screenshot, wherein
    the target object is input by the user or determined based on information about the target image.

8. The terminal device according to claim 7, wherein the information about the target image comprises at least one of: content of the target image or an application to which the target image belongs.

9. A non-transitory computer-readable storage medium, wherein the non-transitory computer-readable storage medium stores a computer program, and the computer program, when executed by a processor of a terminal device, causes the terminal device to perform:
    in a case that M interfaces are displayed on a screen of the terminal device, receiving a first input of a user on K interfaces in the M interfaces;

in response to the first input, performing screen capturing operations on N interfaces that are corresponding to a parameter of the first input, to obtain N first images; and synthesizing the N first images to obtain a target screenshot, wherein the N interfaces are interfaces in the K interfaces, and M, N, and K are positive integers; wherein the N interfaces comprise a first interface and a second interface that are adjacent to each other, and the first input comprises a sliding input from the first interface to the second interface, wherein an input track of the first input comprises a first sliding track on the first interface and a second sliding track on the second interface; a difference between first coordinates and second coordinates is within a preset value range, the first coordinates are coordinates of a last touch point of the first sliding track in a first direction, and the second coordinates are coordinates of a first touch point of the second sliding track in the first direction; and the first direction is perpendicular to a second direction, and the second direction is a direction from the first interface to the second interface.

10. The non-transitory computer-readable storage medium according to claim 9, wherein the computer program, when executed by the processor, causes the terminal device to perform:

synthesizing, according to a target template, the N first images to obtain the target screenshot, wherein the target template is predefined or selected from a set of preset templates.

11. The non-transitory computer-readable storage medium according to claim 10, wherein N is greater than 1; and the computer program, when executed by the processor, causes the terminal device to perform:

arranging the N first images according to the target template, and adding a target object on a target image, wherein the target image is an image in the N first images; and synthesizing the N first images and the target object to obtain the target screenshot, wherein the target object is input by the user or determined based on information about the target image.

12. The non-transitory computer-readable storage medium according to claim 11, wherein the information about the target image comprises at least one of: content of the target image or an application to which the target image belongs.

* * * * *